United States Patent
Dale et al.

(10) Patent No.: US 11,916,871 B2
(45) Date of Patent: Feb. 27, 2024

(54) METHOD AND DEVICE FOR TRANSFERRING ELECTRONIC INFORMATION

(71) Applicant: THE SECRETARY OF STATE FOR FOREIGN AND COMMONWEALTH AFFAIRS, Cheltenham (GB)

(72) Inventors: Robert John Dale, Cheltenham (GB); John Alan Thorp, Cheltenham (GB)

(73) Assignee: The Secretary of State for Foreign and Commonwealth Affairs, Cheltenham (GB)

( * ) Notice: Subject to any disclaimer, the term of this patent is extended or adjusted under 35 U.S.C. 154(b) by 243 days.

(21) Appl. No.: 17/276,137

(22) PCT Filed: Sep. 14, 2019

(86) PCT No.: PCT/GB2019/000132
§ 371 (c)(1),
(2) Date: Mar. 13, 2021

(87) PCT Pub. No.: WO2020/058659
PCT Pub. Date: Mar. 26, 2020

(65) Prior Publication Data
US 2022/0052983 A1 Feb. 17, 2022

(30) Foreign Application Priority Data
Sep. 17, 2018 (GB) .................................. 1815120

(51) Int. Cl.
*G06F 7/04* (2006.01)
*G06F 15/16* (2006.01)
(Continued)

(52) U.S. Cl.
CPC ........ *H04L 63/0209* (2013.01); *G06F 16/164* (2019.01); *H04L 63/06* (2013.01); *H04L 63/123* (2013.01); *H04L 63/145* (2013.01)

(58) Field of Classification Search
CPC . H04L 63/0209; H04L 63/145; H04L 63/123; H04L 63/06
(Continued)

(56) References Cited

U.S. PATENT DOCUMENTS

| 9,967,234 B1 | 5/2018 | Crane et al. |
| 2009/0077372 A1* | 3/2009 | Danieli ................. H04L 51/212 713/153 |

(Continued)

FOREIGN PATENT DOCUMENTS

| GB | 2557010 A | 6/2018 |
| WO | 2018115359 A1 | 6/2018 |

OTHER PUBLICATIONS

United Kingdom Patent Application No. GB1815120.9, Search Report dated Jan. 29, 2019, 3 pages.
(Continued)

*Primary Examiner* — Jeffrey C Pwu
*Assistant Examiner* — Samuel Ambaye
(74) *Attorney, Agent, or Firm* — Kilpatrick Townsend & Stockton LLP

(57) ABSTRACT

A method and device (1) for transferring electronic information between a lesser trusted network (7) and a trusted network (8) is disclosed. The method comprises the steps of: receiving original electronic information from a lesser trusted network (7) in a first electrical zone (2); permitting the original electronic information to be transferred between the first electrical zone (2) and the second electrical zone (4) in one direction only; verifying the original electronic information for at least one predetermined characteristic within (Continued)

Figure 1:
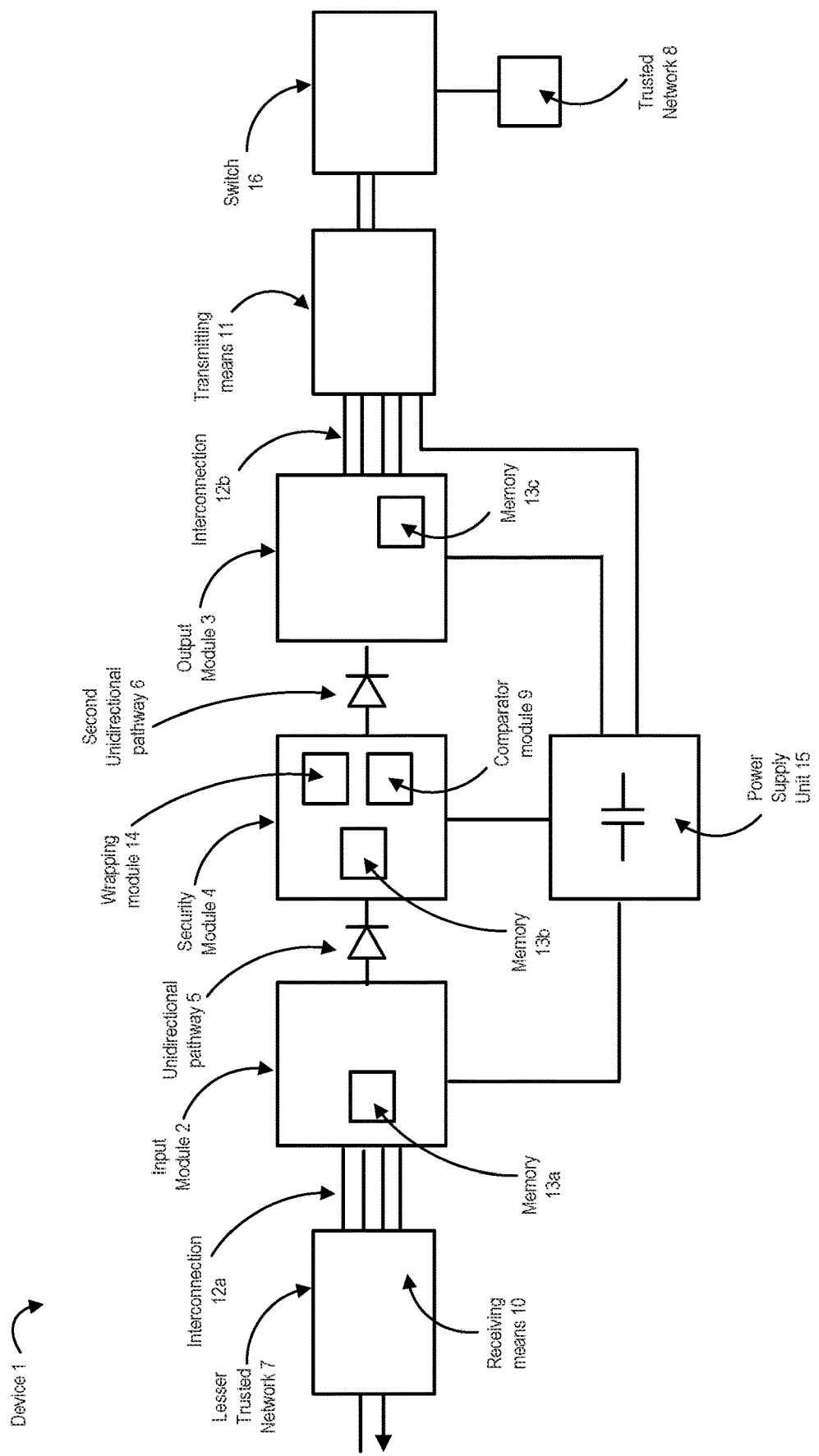

the second electrical zone (4) so as to provide a verifier output status and verified electronic information; forwarding the verified electronic information to a third electrical zone (3). The original electronic information at the first electrical zone (2) is always received by the third electrical zone (3) via the second electrical zone (4) as verified electronic information in either a transformed state or an untransformed state, further wherein the transformed state or the untransformed state is selected dependent upon the verifier output status. The method further providing a time delay to the original electronic information received by the first electrical zone.

22 Claims, 2 Drawing Sheets

(51) Int. Cl.
*H04L 29/06* (2006.01)
*H04L 9/40* (2022.01)
*G06F 16/16* (2019.01)

(58) Field of Classification Search
USPC .......................................................... 726/11
See application file for complete search history.

(56) References Cited

U.S. PATENT DOCUMENTS

2018/0124121 A1* 5/2018 Blöcher ................. H04W 12/02
2020/0412700 A1* 12/2020 Dupont ................... G06F 21/60

OTHER PUBLICATIONS

International Patent Application No. PCT/GB2019/000132, International Search Report and Written Opinion dated Nov. 27, 2019, 11 pages.
United Kingdom Patent Application No. GB19770145.1, Office Action dated Sep. 5, 2022, 9 pages.
Knapp, "Chapter 7: Establishing Secure Enclaves; Chapter 8: Exception, Anomaly, and Threat Detection; Chapter 9: Monitoring Enclaves," Industrial Network Security. Securing Critical Infrastructure Networks for Smart Grid, Scada, and Other Industrial Control Systems, Jan. 1, 2011, pp. 147-247, Syngress.

* cited by examiner

METHOD AND DEVICE FOR TRANSFERRING ELECTRONIC INFORMATION

The invention is in the field of file assurance, in particular to provide assurance of the safety of files being transferred between networks of different trust from a cyber security perspective.

There are a lot of benefits of living in an interconnected internet age, the unfortunate effect however is the fact that you are continually being probed for a weakness in the software used in your network infrastructure and that malware can enter an organisation's network via multiple routes.

When a malicious file is received by a device then every care should be taken not to execute that file. Unfortunately, there is software intended to protect you that is looking at the file when you don't realise it, for example antivirus scans are carried out automatically at regular intervals and in some instances the malicious file could enable a deviant to take over the antivirus so as to provide a cyber security threat to your computer and network.

It is common to use file or packet filters to prohibit the passage of malicious files to your network whereby malicious files are blocked after an assessment of the file has been made, for example the filter may limit the forwarding of files of a certain file type, file size or format, for example string type.

However, in such cases the filter completely removes the file and there is no knowledge that you have been targeted by a cyber attacker, albeit unsuccessfully so.

To overcome this problem, it is known for the file to be redirected, rather than deleted, but this can require additional infrastructure and control that may be costly and inconvenient to implement, and this provides yet another potential back door to your network.

There is identified a need for a file transfer method and device that guarantees the transfer or parsing of the entire file or streamed data received from the lesser trusted network regardless of its content or format, whilst ensuring that any threat of malicious content in the file is contained so as to prevent cyber attacks or other malicious events on a trusted network. This beneficially provides important information about the content of the malware. Such cyber attack knowledge can help strengthen systems because information on the form of the malware enables the upgrade of systems to eliminate weaknesses and ultimately optimise system defences against such threats.

The passage of malicious files enables the monitoring of the type and quantity of attacks and the malicious file can be studied in a controlled setting within your trusted infrastructure and can in fact provide you with the knowledge of how to react to any such attack going forward.

Providing a product that has improved service continuity and is retrofittable within an existing hardware and network infrastructure is hugely beneficial to users as it reduces the burden of time and cost relating to installation whilst ensuring the monitoring of the malicious files in a controlled and reliable manner on the trusted network wherein any files passed to the trusted network can be assured as being safe. In addition to files there is a need to pass other types of electronic data (e.g. a stream of data comprising data packets) from the lesser trusted network to the trusted network.

Accordingly, there is provided a method of transferring electronic information between a lesser trusted network and a trusted network comprising the following steps;

receiving original electronic information to be transferred from a lesser trusted network in a first electrical zone;

permitting the original electronic information to be transferred between the first electrical zone and a second electrical zone in one direction only;

verifying the original electronic information content for at least one predetermined characteristic within the second electrical zone so as to provide a verifier output status and a verified electronic information;

forwarding the verified electronic information to a third electrical zone, wherein the original electronic information at the first electrical zone is always received by the third electrical zone via the second electrical zone as a verified electronic information in either a transformed state or an untransformed state, the method further comprising providing a time delay to the original electronic information received by the first electrical zone.

Beneficially this enables the user to obtain an understanding of whether there has been an attempted cyber attack, and this also permits forensic analysis of the type of cyber attack and offers the ability to identify patterns and improve prevention strategies. This information can then be used to warn others of a potential threat. Electronic information may be considered to be the 'thing' being conveyed, but this may also encompass electronic data which are the bit and byte values i.e. the values in the bmp or structured text files e.g. CSV.

The electrical zone could also be considered to be an electrical module or processor.

The time delay feature ensures the provision of service continuity i.e. ensures that all data received by the first electrical zone is transferred to the third electrical zone via the second electrical zone.

Due to the one directional nature of the device, there is no possibility of applying a back-pressure from the second electrical zone to the first electrical zone e.g. by providing feedback from the second electrical zone to the first electrical zone. To enable the most efficient use of the device while assuring no data loss there may be provided an algorithm at the first electrical zone which is implemented to calculate the state of the second electrical zone dependent upon, from among others, the type of transformation applied e.g. wrapping algorithm used in the second zone.

Alternatively, the time delay may depend on the bandwidth of the electrical connection between the lesser trusted network and the first electrical zone. Alternatively, the time delay may depend on the latency of an electrical connection located between the lesser trusted network and the first electrical zone. As a further alternative, the time delay may depend on other properties of the electrical connection between the lesser trusted network and the first electrical zone. Such properties may comprise data loss, congestion and jitter.

The transformed state or the untransformed state may be selected dependent upon the verifier output status.

The method step of permitting the original electronic information to be transferred between the first electrical zone and a second electrical zone in one direction only may comprise forwarding the original electronic information along at least one unidirectional pathway located between the first electrical zone and the second electrical zone. In this arrangement, the first unidirectional pathway prevents information being pulled from the second electrical zone which is in communication with the trusted network. This provides an element of isolation in the undesired direction of operation.

Similarly, the method may comprise permitting the verified electronic information to be transferred between the second electrical zone and a third electrical zone in one direction only. To provide this feature, the verified electronic information may be passed from the second zone along at least one second unidirectional pathway to the third electrical zone.

In this arrangement, the second unidirectional pathway prevents information being pulled form the third electrical zone which is in communication with the trusted network.

If no predetermined characteristic is satisfied, the original electronic information may be transformed into the verified electronic information having a transformed state. Therefore, the original electronic information can be converted into a different form.

The verified electronic information in the transformed state may preferably comprise the original electronic information in a wrapped form. Therefore, the transformation applied to the original electronic information may comprise the wrapping of the original electronic information and occurs in the case where the original electronic information cannot be adequately assured as being safe for the users trusted network.

The verified electronic information in the transformed state comprises the original electronic information in a wrapped form. Therefore, the transformation applied to the original electronic information may be the wrapping of the original electronic information and occurs in the case where the original electronic information cannot be adequately assured as being safe for the users trusted network.

Therefore, in the case that the verifier determines that the original electronic information is not in a predetermined file format/or of the predetermined type, the second electrical zone triggers a wrapping function (in the form of a coded algorithm) to wrap the original electronic information prior to forwarding it on to the third electrical zone.

The verified electronic information in the transformed state may comprise the original electronic information plus a new header.

The method may further comprise creating the verified electronic information in the transformed state by using the mathematical algorithm and a key. The key may be an electric key. For avoidance of doubt the mathematical algorithm may be a wrapping algorithm.

The key may be locally generated, pre-shared or comprise an index to a directory of pre-shared keys.

The key may be stored in the new header of the verified electronic information in the transformed state prior to forwarding the verified electronic information in the transformed state to the third electrical zone. Therefore, the key is stored in the new header of the wrapped electronic information and the key is accessible when the electronic data is to be unwrapped.

Alternatively, the electronic information to be transferred may be a stream of data comprising data packets. In particular an undetermined number of data packets.

Preferably, the original electronic information may comprise an input file. In particular a file of a fixed length. An input file is a file received by the device at the first electrical zone. The duration of the time delay may be calculated in dependence upon the file size of the file to be received by the first electrical zone. Alternatively, the time delay may be dependent upon packet size of the stream of data.

Therefore, the original electronic information is checked against a compliance rule which identifies a characteristic for which there is an associated action.

In the case that the original electronic information is an input file, the input file may be compared to a predetermined file size limit and in the case that the original file is of a size that exceeds the predetermined file size limit, the original file may be transferred to the second electrical zone and the transformation of the file may be automatically triggered providing a transformed file, for example a wrapped file. Files that are below the file size limit may be assured assuming the file characteristics are met. There is therefore provided an assured file size limit. Anything that is above this file size limit is automatically transformed/converted/wrapped.

The predetermined characteristic (that is verified by the verifier) may comprise at least one predetermined file type. For example specific structured text file types e.g. CSV or image file types e.g. BMP file types may be set as the predetermined characteristic. The verifier may verify the file types in parallel and it is expected that only one positive result would be achievable.

In an alternative embodiment of the invention there is provided a device for transferring electronic information from a lesser trusted network to a trusted network comprising:
    a first electrical zone for receiving original electronic information to be transferred;
    a second electrical zone comprising a verifier for verifying at least one predetermined characteristic of the original electronic information to be transferred so as to provide a verifier output status and verified electrical information;
    at least one means for transferring the original electronic information between the first electrical zone and second electrical zone in one direction only; and
    a third electrical zone for receiving the verified electronic information from the second electrical zone;
    wherein the original electronic information from the first electrical zone is always received by the third electrical zone via the second electrical zone as verified electronic information in either a transformed state or an untransformed state, the device further comprising a delay generator for delaying the input of the file to be transferred to the first electrical zone.

The delay generator may comprise a delay algorithm.

The device may comprise a processing means for selecting the transformed state or the untransformed state of the verified file dependent upon the verifier output status.

The first electrical zone may be separate and distinct from the second and third electrical zone. In this case, the second and third electrical zone may be located on a common module or processor. Alternatively, the device may comprise the second and third electrical zones being separate and distinct from each other. Whilst it is feasible for the second and third electrical zones to be located on a common module or processor, maximal isolation of the second electrical zone is achieved by separating the second and third electrical zones on respective modules or processors.

The first electrical zone may comprise a memory to buffer the original electronic information which is used to determine whether the original electronic information is greater than a predetermined electronic information size limit of the memory.

The second electrical zone may further comprise a transformation means comprising an algorithm for transforming the original electronic information into verified electronic information in the transformed state.

The algorithm may be an original electronic information wrapping algorithm.

The second electrical zone may comprise a key generator for generating an electronic key to be used with the algorithm. The electronic key may comprise a symmetric key.

The second electrical zone may be configured to insert the key into a header of the transformed verified electronic information to enable unwrapping of the electronic information.

The first electrical zone may be configured to be in communication with the lesser trusted network.

The third electrical zone may be configured to be in communication with the trusted network.

The second electrical zone may be configured to receive original electronic information from the first electrical zone and is prohibited from receiving verified electronic information from the third electrical zone.

The first electrical zone, second electrical zone and third electrical zone may comprise at least one first processor, second processor and third processor respectively.

The second electrical zone is configured to forward verified electronic information to the third electrical zone and is prohibited from forwarding original electronic information or verified electronic information to the first electrical zone.

The electronic information may be a stream of data packets. Alternatively, the electronic information may be a file.

Preferably, the file size of the file is not a parameter in the wrapping algorithm.

The duration of the time delay of the input file reaching the first electrical zone is in dependence upon the file size of the input file received by the first electrical zone.

The verified file in a transformed state may be a wrapped file of file size equating to the size of the file to be transferred plus the size of the new header.

The at least one means for transferring the original electronic information between the first electrical zone and second electrical zone in one direction only comprises at least one first unidirectional pathway.

The device may further comprise at least one means for transferring the verified electronic information between the second electrical zone and the third electrical zone in one direction only. This beneficial one directional effect may be provided by locating at least one second unidirectional pathway between the second electrical zone and the third electrical zone. This ensures that electronic information i.e. a file from the third electrical zone, cannot be pulled back to the second electrical zone by malicious electronic information yet to be transformed/converted/wrapped.

The at least one unidirectional pathway may comprise at least one hardware component.

The hardware component may comprise at least one SerDes pin and/or a unidirectional amplifier.

In an alternative embodiment of the invention there is provided a computational device for transferring electronic information from a lesser trusted network to a trusted network comprising a device as here-before described.

Computational devices may comprise a desktop or laptop computer, tablet, personal digital assistant (PDA), mobile phone, smart watch, hard disc, solid state disc or drive, memory, or other smart or mobile device, or IOT device capable of storing and/or displaying data or otherwise acting as a data device, or a display device comprising a monitor, projector, screen or the like, capable of storing and/or displaying data or otherwise acting as a data device are also disclosed, which may individually and/or collectively comprise a device as outlined above for the user's convenience.

"Unidirectional" means only permitting passage of the electronic data or electronic information, for example a file or streamed data in one direction e.g. from the first electrical zone to the second electrical zone. This ensures that any electronic information from the second electrical zone cannot be passed back to the first zone. This provides isolation of secure services on the second zone from the network services on the first electrical zone, whilst allowing for information to be transferred between the first electrical zone and second electrical zone.

"File" means an ordered set of bytes of determinate length. Frequently the file comprises a header and a payload, although it is noted that most structured text formats do not have a header. As an example, it is usual for a MP to have several headers. The "Original File" means the file received by the first electrical zone. Note that alternatively instead of a file the electronic data information provided at the first electrical zone may be a stream of data comprising data packets, the number of data packets being undetermined.

"Verified File" is a file that is assessed to meet a file type specification.

"Trusted network" means a business or other organisation's network that is under the control of a network manager or network administrator and which functions within security parameters to form a security perimeter. The trusted network is the destination of the electronic information e.g. file or streamed data.

"Lesser trusted network" means a network that is deemed untrusted or of unknown trust which lies outside of the security perimeter of the business or other organisation.

Whilst the invention has been described above it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which:—

Figure 2:
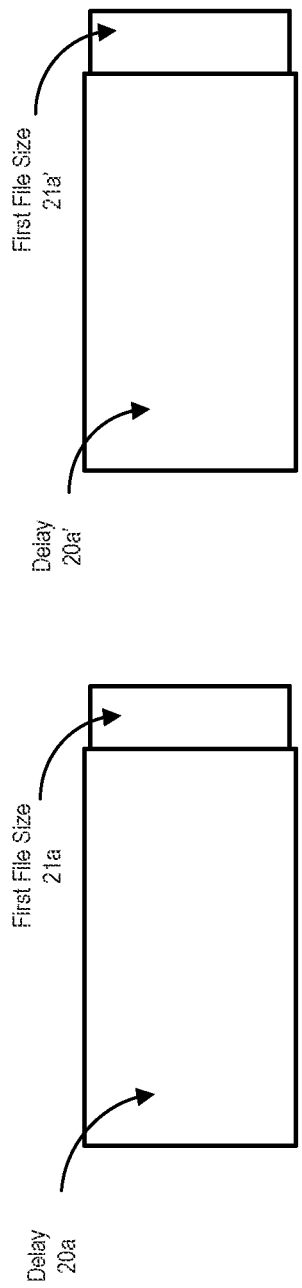
Figure 2:
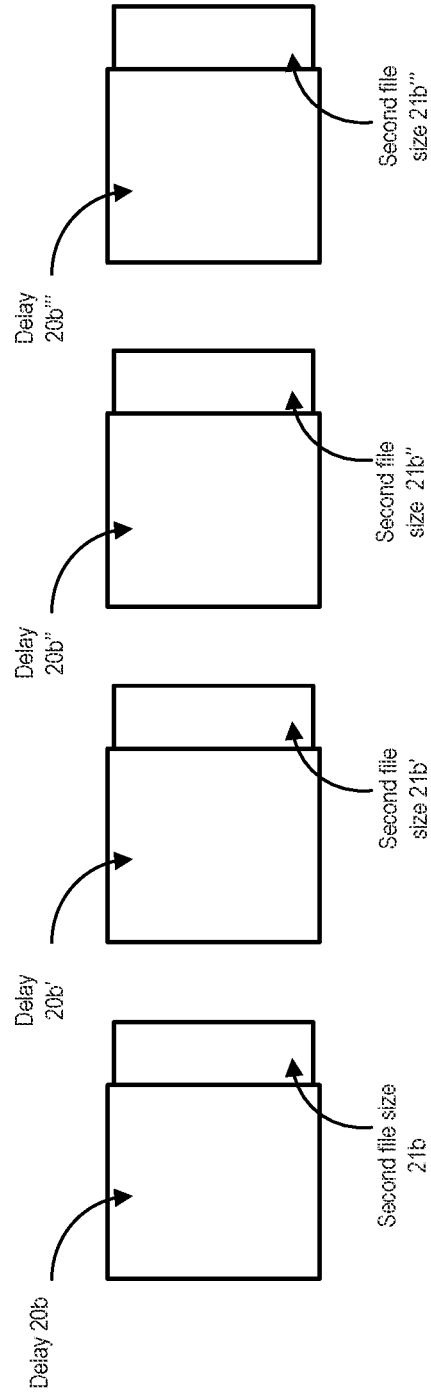

FIG. 1 is a schematic of the electronic information transfer device in accordance with the invention; and FIG. 2a shows the variation in delay applied to the incoming file dependent upon a first file size of the incoming file in accordance with the invention of FIG. 1; and FIG. 2b shows the variation in delay applied to the incoming file dependent upon a first file size of the incoming file in accordance with the invention of FIG. 1.

In the Figures like elements are denoted by like reference numerals. The skilled reader will appreciate how complex the implementation of the method is, and thus the number of the optional features present, will be driven by the user requirements.

Referring to FIG. 1, there is shown a first embodiment of the invention where there is provided a device 1 comprising an input module 2, an output module 3 and a security module 4 located between the input module 2 and the output module 3. There is provided a unidirectional pathway 5 between the input module 2 and the output module 3 so as to enable passage of a file between the input module 2 and the security module 4. There is further provided a second unidirectional pathway 6 located between the security module 4 and the output module 3 so as to permit the transfer of a file from the security module 4 and the output module 3. The input module 2 is in communication with an external network (which is considered to be a lesser trusted network 7, for example the internet) and the output module 3 is in communication with a trusted network 8 (for example an internal network of a company).

The main objective is for all files received by the input module 2 to be successfully forwarded to the output module 3, via the security module 4. Therefore, there will be an output from the output module 3 for every file that is received by the input module 2, as such this method does not offer the conventional filtration capability of the prior art.

The original file is assessed in the security module 4 by verifying against formats that can be expressed and assessed, for example in an algorithm of state machine form, whereby the user choses to verify all data against one or more data serialisation languages e.g. CSV, or image files e.g. bitmap (BMP) file types. The results of the verification process then determine the format of the file to be forwarded towards the output module 3.

In the case that the comparator module 9 (or verifier) determines the file is in a predetermined file format, the file is forwarded onwards to the output module 3 in its original form. However, in the case that the comparator module 9 determines that the file is not in a predetermined file format, the security module 4 triggers a wrapping function (not shown) to wrap the file prior to forwarding it on to the output module 3. Therefore the file is transformed from the original file type to a wrapped file type and can be considered to be a transformed file.

By wrapping the file the device 1 will have changed the format of the file with the effect that any onward component will no longer be able to inadvertently execute (render) the file. The new wrapped file is therefore no longer malicious.

The non-deterministic nature of the file (including portions of the file header where appropriate) means that the wrapped file is effectively immune to malicious attacks that try to craft a file that, when wrapped, is itself malicious.

By wrapping the file the user may have made the original electronic information inoperable and any network or onward recipient can be configured to handle the data without vulnerability of attack.

The first unidirectional pathway 5 and second unidirectional pathway 6 is a hardware component. One or more SerDes pins or unidirectional amplifiers are configured to provide connections between the modules.

The first unidirectional pathway 5 and second unidirectional pathway 6 provides the restriction that the file can be passed in one direction only and this is key to the information assurance of the device 1.

SerDes pins can only function in one direction, input or output, as designated by the underlying silicon. The direction of such pins is not defined by any processing means configuration image, thus their use provides assurance of one way transfer, with it being possible to connect only the forward path physically to, or on, a PCB or substrate, which can be visually inspected.

The objective of the first unidirectional pathway 5 is to ensure isolation of the electronic information contained in the security module 4 from the input (first) module 2. As a result, the data stored on the security (second) module 4 cannot be pulled to the input module by an unauthorised individual. Using a combination of the at least one SerDes pin and a unidirectional amplifier for the unidirectional hardware ensures that more than one failure must occur for the device to be compromised. Therefore once again this provides an extra layer of assurance that the device is working securely and that there is no leakage of unwanted data between the security module and the input module. The high reverse isolation property of the amplifier ensures that any variation in the output is not mirrored in the input i.e. it improves the isolation characteristic between the most trusted interface and the other (lesser-trusted) interface.

The unidirectional amplifier (not shown) comprises a unity gain amplifier having high reverse isolation characteristics which ensures one way data travel is provided should any of the termination sensing circuit associated with the SerDes be used as a return path.

A first and second SerDes pin is configured with a unidirectional amplifier positioned there-between (not shown). Therefore, the unidirectional amplifier is positioned in series with the first SerDes pin and similarly the unidirectional amplifier is positioned in series with the second SerDes pin.

The device 1 uses a transceiving means for a network connection. The transceiving means comprises a receiving means 10 and a transmitting means 11. Both the receiving means 10 and the transmitting means 11 comprise an ethernet interface, for example known 8P8C (commonly referred to as the RJ45 connection) which is convenient for the user as it is a common and robust interface type.

The device 1 is retrofittable and can be included prior to permitting data to be used, for example, in a specific process, on their network, or by a specific node.

The input module 2, security module 4 and output module 3 comprise a processing means in the form of a Field Programmable Gate Array (FPGA). FGPAs are readily available and cheap, thus are suited to examples of how the invention may be put into effect.

A file is received by the receiving means 10 located in communication with the input module 2 and travels notionally from left to right through the file transfer device 1 to the transmitting means 11 located in communication with the output module 3. This means that the input module 2 can be considered the first module, the security module 4 can be considered to be the second module and the output module 3 can be considered to be the third module. An interconnection 12*a* between the receiving means 10 and the input module 2 as well as an interconnection 12*b* between the output module 3 and the transmitting means 11 comprise bi-directional data flow to support standard layer 2 and layer 3 signalling.

Each module comprises memory 13*a*, 13*b*, 13*c* in the form of SDRAM to support buffering of the file.

At the input module 2 the file is received by the buffer. The file size is compared to a predetermined size limit x provided by the memory. In the case that the file size is at or below the file size limit x, it will be held in the buffer, clocked and then forwarded to the security module 4. In fact, the file will be forwarded to the security module 4 regardless of whether the file limit has been exceeded, however if the file is bigger than the predetermined maximum file size limit x the file will always be treated as malicious and will leave the security module 4 in a wrapped/transformed state.

A separation of functions between the input module 2 and the security module 4, and the security module 4 and the output module 3 permits a further degree of assurance for the user, because the secure functions are separated from the non-secure ones. The input module 2 substantially manages network services with the lesser trusted network, the security module 4 substantially manages the secure services and the output module 3 substantially manages the network services relating to the trusted network. Therefore, the security module 4 which provides the security enforcement function is isolated from the lesser trusted network and the file is not parsed to the output module 3 until the following steps have been applied:

The file is buffered;

The file is compared to a predetermined file type by the verifier/comparator 9, for example BMP or a structured text format e.g. CSV, in the case this predetermined file type is verified a successful verifier output status is provided and the file is output to the output module 3 in an unwrapped (unaltered) state;

In the case that the predetermined file type is not detected by the verifier/comparator 9, the verifier output status is a fail and the original file is treated as being malicious, triggering the wrapping module 14 to function and the failed file is passed to the output module 3 in a wrapped state.

The file comparator 9 must use a good robust definition of the file criteria, for example file format and the criteria must be narrow such that almost all files will not meet the criteria.

The comparator/verifier 9 carries out the specified checks simultaneously and there are two outputs: i. all the checks have failed (i.e. the verifier output status indicates a failure) and ii. one check has succeeded (i.e one of the file types has been determined as being present and the verifier output status indicates a success).

The wrapping module 14 uses a mathematical function to wrap the code.

The wrapped file comprises the original file plus a new header, therefore the file in the wrapped state is of file size equating to size of the original file plus the size of the header. A non predictable key is generated by a random number generator. The symmetric key is located in and able to be accessed from the new header of the wrapped file. In this wrapped state the file is inert and incapable of being executed. Therefore any malicious content in the wrapped file cannot be accessed until the file is unwrapped using the symmetric key. This provides the user with a simple way of ensuring the resulting file can be made available to them in a format that is acceptable to them from a potential cyber attack perspective.

The file size of the input file coming into the device 1 may not be the same size as the file size coming out of the device 1, for example an original file sized at 1 gigabyte could result in a 1 gigabyte file plus an additional header coming out from the output (third) module 3. For the system to operate effectively and efficiently and with maximum throughput there is need for a time delay to be applied to the original file at the input to allow for this additional file size to be passed from the output module 3 to memory or another location via the transmitting means 11. Usually this type of delay would be provided by a delay in the acknowledgement from the output module 3 to the input module 2, however there is no ability to provide such an acknowledgement in this device due to the lack of a return path. Therefore, there is a requirement to adapt the time delay of the input via an alternative means. A predictive algorithm is applied in this embodiment which calculates the delay in dependence upon the input file size of the electronic information as shown in FIG. 2*a* and FIG. 2*b*. FIG. 2*a* shows how the delay 20*a*, 20*a*' is provided a first file size 21*a*, 21*a*' and FIG. 2*b* shows how the delay 20*b*, 20*b*', 20*b*'', 20*b*''' is provided for a second file size 21*b*, 21*b*', 21*b*'', 21*b*'''.

To enable the most effective use of the device while assuring no data loss the delay algorithm is located at the input module 2 and is configured to calculate the state of the security module 4 based on the worst case scenarios of the behaviour of the wrapping algorithm located within the security module 4 and subsequent characteristics of the outbound path from the security module 4 towards the trusted network. The calculation allows the input module 2 to modulate the acceptance of data into the input module 2 from the lesser trusted network 7 and modulate the forwarding of data from the input module 2 to the security module 4 over the unidirectional pathway 5 to ensure that the security module 4 is able to accept the forwarded data. The modulation may take the form of inter-file delays or the form of inter-packet delays. The delay need not be constant between packets nor between files. Further, the delay may vary dependent upon measured network parameters. Notably there are two sorts of delay: traffic and compute. Even if the traffic can flow through the first electrical zone with zero traffic delay, it will take time to carry out the verification step at the second electrical zone, and the next file cannot be sent until this time is also passed. Also the calculation for the creation of the new header might contribute to a delay.

After receiving the wrapped or unwrapped file, the output module 3 transfers the file to the trusted network via tFTP or other method and can sort the locations of the files based upon their check state e.g. Good (unwrapped) or Bad (wrapped) or different file types may be forwarded to the same or different location in the trusted network. Accordingly, the wrapped file will always be transferred to the server for further analysis and/or for general reference.

In the case of a syntactical error, the file viewer will not be harmed by opening the file, although the file content will not be the expected or desired image or other information.

The electronic modules comprise processing means that are implemented as a "stripe" on a single PCB. From a manufacturing perspective, this ensures a physical separation between the processing means, such that if they are dedicated to one or more particular tasks, the layup or layout of components on a printed circuit board (PCB) or substrate can be easily managed, and from an assurance perspective, connections between each processing means can be physically verified. Connectivity between one or more stripes may be used to enforce a one-way data flow through the device 1.

At least one power supply unit 15 is provided to power the device which is in electrical communication with a switch 16 controllable on the trusted network 8. This permits the device to be self contained, ensuring that from an assurance perspective there is no third party tampering or additional features added when the data filter is powered. To fully ensure this self-containment, the modules are powered by the trusted network 8 from a power over Ethernet connection, for example through a RJ45 located within the device housing. The power is then forwarded to each of the three stripes that are connected to the respective modules. The power and data paths are separate and distinct. The three modules are therefore powered over the Ethernet, which is a convenient source for the user, not requiring external connections or power draw. This power over Ethernet (PoE) is sourced from a trusted network port so as to minimise the risk of side-channel communications. Therefore, each of the modules (or processors) take a common voltage feed, for example a 48V feed, however the set up is configured to prevent unintended transmission of information between the most trusted network 8 and the lesser trusted network 7. For example, it is known to be able to monitor transformer characteristics as a way of determining information on the operation of a device e.g. by monitoring data transfer associated with the system to provide information on the actual data being transferred across the system. By ensuring that the power is supplied from the trusted Ethernet interface only then the ability of a third party accessing such information in this way is minimised. The module contains configuration code to load the field programmable gate arrays.

A processor selection characteristic is implemented to ensure that the correct processor/module is linked with the correct FPGA, for example, a particular FPGA can only function with a predetermined processor which is identifiable by verifying the position of the processor/module. Therefore the processor position is hard wired on the FPGA. This provides further certainty that there has not been any unintentional transfer of information between the most trusted interface with the lesser trusted interface. The separation of each of the processors (modules) is further assured by clearly identifying the individual circuitry on the board (e.g. by ensuring that the stripes are separate and distinct).

This device 1 is implemented as an input device, therefore the power is supplied from the transmitting means 11 end. However if this was to be used as an output device the power will still be supplied by the trusted end, but will be received by the receiver.

Similarly nothing can be transferred between the output module 3 and the security module 4, so there is no concern of any of the data from the trusted side being accessed by the lesser trusted network 7.

The device comprises bitstream encryption (not shown). As data for example configuration data, presented to or generated by the invention may not comprise more than a raw, unencoded bitstream, encrypting it adds a layer of commercial grade protection and assurance to hinder or prevent copying and/or reverse engineering of hardware designs, and/or to guard against malicious interception or disruption. There is also provided Single Event Upset (SEU) mitigation which is deployed at the chip or system level to overwrite, rewrite or modify data to correct soft errors if, for example, it is wrong or has been corrupted, saving the user time in that they may avoid the need to perform a system reboot to correct such an error.

The housing of the device (not shown) is clearly marked to indicate the direction of the unidirectional effect. This means that the direction of the flow of data/information through the transfer device 1 is clearly marked (not shown) on the external surface of the housing. The provision of only two connectors per data transfer device 1, one being the input and the other being the output also reduces the possibility of incorrectly installing the device 1.

The mark may be, for example, a print of a circuit diagram of a diode. Alternatively, the mark may be formed in the outer surface of the housing during manufacture or applied subsequently to manufacture of the housing. The mark ensures that the receiver end of the filter and the transmitter end of the filter are clearly identifiable to the user. The desired direction of implementation is dependent on the intended use of the device i.e. as an import or export device.

The form factor of the device 1 is designed to allow easy visual inspection that all the wires go to the correct ends of the device i.e. there is no overlap of the wires.

The device 1 is configurable by a user, in that they may set the rules when decisions need to be made, or indeed determine which method steps are used, as well as determining other configurations such as determining destinations for the data when continuing, replication, backup regimes, etc.

Increasing the external surface area of the housing of the device, for example by providing fins or channelled side walls (not shown), maximises the cooling of the internal components, however further external cooling means known to the skilled reader may be provided to improve the cooling effect on this channelled side.

Beneficially, the embodiment of the invention does not rely on the use of a software stack or CPU and as such there is no requirement for any patches to be implemented or further servicing to be provided. This makes the device 1 entirely stand-alone and capable of ensuring separation between the secure services and the network services as may be required by a user. Further by minimising the lines of code accessible (both in general and specifically accessible from the network services side) this arrangement minimises the possible points of attack (known as the attack surface) making the access to the secure services difficult from the non-secure side of the device. Also this provides the benefit of the device 1 never needing to be patched throughout it's lifetime, removing management burden and costs in this regard. By using a hardware means for the unidirectional link or pathway 5, 6 between the most trusted and lesser trusted interfaces it is possible to minimise the software component thereby ensuring that the device cannot be tampered with remotely i.e. the only way to tamper with the device is to physically access it so as to modify the firmware or the electronic components. Accessing the device 1 is prohibited when the device 1 is stored in a secure facility.

The verification and transformation capabilities of the device 1 make it suitable for use as a validator module for example in an Internet of Things (IoT) device, thereby providing a security offering in this field. The validator module would be configured to sit in the data path and protect the device from malicious payloads (so making the attack surface much smaller).

It is important to note that to enable the device 1 to work the Ethernet is inherently bidirectional and must remain so to operate as required. Therefore, the data transfer means located prior to the input module 2 and subsequent to the output module (in the first embodiment only) are also bi-directional.

Various modifications to the principles described above would suggest themselves to the skilled person. For example, whilst in the embodiment there is described the use of checking against Bmp or a structured text format e.g. CSV the skilled reader will appreciate that any verifiable file format may be used and that the structured text format e.g. CSV and image files e.g. Bmp are simply used as examples and should not be seen as limiting the invention. Further, whilst the embodiment discloses the use of SerDes pins and unidirectional amplifiers, any other electronic components or apparatus that provide a unidirectional pathway may be implemented, for example optical fibre.

It is also possible to implement the file transfer device 1 using substantially equivalent hardware, such as Application Specific Integrated Circuit (ASIC), or a dedicated circuit as the user may require. Combinations of at least one or multiples of FPGAs, ASICs or integrated circuits may be applied. The provision of a validator ASIC for the Internet of Things application may be particularly beneficial.

In the case where a user has no management constraints, the algorithms may be run using software on a general purpose Computer, but regular patches are likely to be required if this alternative is implemented and the attack surface would be substantially higher.

As an alternative there may be more than one receiving means should the user wish to receive data from more than one source, and more than one transmitting means should the user wish to transmit data to more than one destination. Likewise the receiving means 10 and transmitting means 11 could comprise one unit.

One or more data transfer devices 1 may be designed in to a PCB.

The skilled person would be aware that the memory for the buffering need not be in the form of SDRAM, but may instead be equivalent memory types such as RAM, SRAM or static disc which could be used individually or collectively, for example the skilled person would be aware that the buffer limit can be overcome by subdividing the file to be ingested beforehand, such as tessellating a 2N×2N bmp image into 4 N×N images.

The file transfer device 1 can be used to export information from the trusted network 8 to the lesser trusted network 7 if desired. This is merely determined by the orientation of the device 1. To ensure the correct orientation of the device, the device is provided with a single input in the form of a first connector (for example a RJ45 connector), and a single output (for example a RJ45 connector). The data can only be transferred between the first connector and the second connector. The first connection means cooperates with one end of the first data transfer link, for example a cable such as a CAT 5 or 6 ethernet cable, and the other end of the data transfer link is connected to the first user interface. The second connection means cooperates with one end of the data transfer means for example a cable such as a CAT 5 or 6 ethernet cable, and the other end of the second data transfer means is connected to the second user interface. It is re-emphasised that this arrangement ensures there is no overlap between the first data transfer means and the second data transfer means which once again ensures the correct set up of the device and minimises the risk of permitting undesirable information transfer.

When considering the re-enforcement of the uni-directional nature of the device by using multiple hardware components, this component need not be an amplifier, but may instead be an alternative unidirectional high speed serial communications component known to a person skilled in the art. Also the SerDes pin may not be utilised.

Whilst other candidates for text formats could be used e.g. JSON, YAML and XML, they may not be desirable due to, for example, their complexity or their lacking in richness to make the data self describing. Therefore the device is more reliable when using a text format that can be validated in a simple state machine, whereby the text format is used as the predetermined file type. This beneficially minimises the attack surface of the validation engine, which is an important consideration in a security device.

Ultimately the device can be kept simple and reliable by using simpler file formats.

An alternative way of running the algorithms is on a single board computer connected by a pair of one way fibres.

Instead of using a transceiver means 10, 11 the data may be provided via serial cables and other non RJ45 connectors (e.g. fibre). Alternatively it could be board mounted on a wider board and plumbed in using, for example a PCIe bus.

It needn't be a state machine that verifies the file format. However, as the computational complexity for verification of inputs is increased, then eventually the end result is a device that is very hard to assure and which likely needs to be patched regularly, making the lifetime of any assurance short. The simplicity of the current invention is what provides the required level of assurance across the lifetime of the device.

Rather than the input module comparing the size of the original file, the input file may declare it is of a size that is greater than the predetermined assured size limit an and the second module will trigger to wrap the file.

As an alternative, where the file is to be encrypted, the user has a set of preshared keys and places an index to reference a specific key that is used for encryption of the file.

As an alternative, the key to be stored in the new header of the wrapped file may not be generated locally to the device, but may instead comprise a preshared key or an index to a list of preshared keys, for example a key dictionary.

In a further alternative of the invention instead of the unidirectional pathway, other technical means may enforce the necessary single direction electronic information transfer between two zones, for example the device may permit transfer of the electronic data between a first electrical zone and a second electrical zone by means of a firewall.

In the case that the input file declares a file size that is greater than the predetermined file assurance limit, the unwrapped data can always be assured as being safe by the device. This is because if the file is lying about the file length being too long, or if it is telling the truth about the file length then in both circumstances the file will be automatically wrapped as it fails the file size check. In the case that the file asserts a short length on a long file could this be potentially problematic, however if the short file assertions are simply ignored this enables the device to revert back to the file size check.

In an alternative embodiment of the invention the delay of the file or the data packets may be provided by a hardware means (e.g. using a length of wire) rather than a software means.

In an alternative embodiment, the security module 4 may be located with the output module 3 which is in communication with the trusted network 8 to form a combination second module (not shown). The combination second module (not shown) is therefore formed of a security electrical zone and an output electrical zone. The input module 2 can be considered an input zone. In this case, the input module 2 and combination second module (not shown) are connected via a uni-directional pathway 5. The electrical transfer between the circuitry of the security module 4 and the circuitry of the output module 3 is still provided by a unidirectional link. In an alternative embodiment, the electrical transfer between the circuitry of the security module 4 and the circuitry of the output module 3 is not provided by a unidirectional link, but by a conventional bi-directional cable or a line. In such an embodiment, the trust level of the verifier at the security zone is commensurate with that of the trusted network 8.

In all cases the reference to the invention being used on an original file also applies to the invention being used on packets of streamed data. A stream of data of indefinite duration (e.g. from a video feed) may be passed through the device 1. This is enabled due to a feature in the wrapping algorithm whereby the size of the file or data packet is not a parameter in the wrapping algorithm, which is important to allow the fast forwarding of non-compliant files.

The invention claimed is:

1. A method of transferring electronic information between a lesser trusted network and a trusted network comprising:
   receiving original electronic information to be transferred from a lesser trusted network in a first electrical zone;
   permitting the original electronic information to be transferred between the first electrical zone and a second electrical zone in one direction only;
   verifying the original electronic information content against at least one predetermined characteristic within the second electrical zone so as to provide a verifier output status and verified electronic information;
   forwarding the verified electronic information to a third electrical zone, wherein the original electronic information at the first electrical zone is always received by the third electrical zone via the second electrical zone as verified electronic information in either a transformed state or an untransformed state; and providing a time delay to the original electronic information received by the first electrical zone, wherein the time delay is based on a prediction of a state of the second electrical zone in dependence upon a computation for verifying the original electronic information at the second electrical zone and is applied to the original electronic information at the first electrical zone.

2. The method of claim 1, wherein a duration of the time delay is calculated in dependence upon one or more of properties of a network connection located between the lesser trusted network and the first electrical zone.

3. The method of claim 1, further wherein the transformed state or the untransformed state is selected dependent upon the verifier output status.

4. The method of claim 1, wherein if no predetermined characteristic is satisfied, the original electronic information is transformed into the verified electronic information having a transformed state.

5. The method of claim 1, wherein the verified electronic information in the transformed state comprises the original electronic information plus a new header.

6. The method of claim 1, further comprising creating the verified electronic information in the transformed state by using a mathematical wrapping algorithm and a key, wherein said key is preferably locally generated, preshared or comprises an index to a directory of preshared keys.

7. The method of claim 1, wherein a duration of the time delay is calculated in dependence upon a size of the electronic information to be received by the first electrical zone.

8. The method of claim 1, wherein the predetermined characteristic comprises original electronic information type.

9. The method of claim 1, wherein transfer of the verified electronic information between the second electrical zone and the third electrical zone is permitted in one direction only.

10. The method of claim 9, wherein the verified electronic information is passed from the second electrical zone along at least one second unidirectional pathway to the third electrical zone.

11. The method of claim 1, wherein the original electronic information to be transferred comprises a file, and wherein the file is compared to a predetermined file size limit and in a case that the file is of a size that exceeds the predetermined file limit, the file is transferred to the second electrical zone and the transformation of the file is automatically triggered providing a wrapped file.

12. A device for transferring electronic information from a lesser trusted network to a trusted network comprising:

a first electrical zone for receiving original electronic information to be transferred;

a second electrical zone comprising a verifier for verifying at least one predetermined characteristic of the original electronic information to be transferred so as to provide a verifier output status and verified electronic information;

at least one pathway for transferring the original electronic information between the first electrical zone and second electrical zone in one direction only; and a third electrical zone for receiving the verified electronic information from the second electrical zone;

wherein the original electronic information from the first electrical zone is always received by the third electrical zone via the second electrical zone as a verified electronic information in either a transformed state or an untransformed state, the device further comprising a time delay generator for delaying an input of the original electronic information to be received by the first electrical zone, wherein the time delay generator is configured to predict a state of the second electrical zone in dependence upon a computation for verifying the original electronic information at the second electrical zone and is configured to provide a predicted time delay to the original electronic information at the first electrical zone.

13. The device of claim 12 further comprising a processor for selecting the transformed state or the untransformed state of the verified electronic information dependent upon the verifier output status.

14. The device of claim 12, wherein the first electrical zone is separate and distinct from the second electrical zone and third electrical zone.

15. The device of claim 12, wherein the second electrical zone and third electrical zone being separate and distinct from each other.

16. The device of claim 12, wherein the second electrical zone further comprises a transformation stage comprising an algorithm for transforming the original electronic information into a verified electronic information in the transformed state.

17. The device of claim 16 wherein the second electrical zone comprises a key generator for generating a key to be used with the algorithm, and configured to insert the key into a header of the transformed verified electronic information to enable unwrapping of the verified electronic information.

18. The device of claim 12, wherein the second electrical zone is configured to receive original electronic information to be transferred from the first electrical zone and is prohibited from receiving verified electronic information from the third electrical zone.

19. The device of claim 12, further comprising a unidirectional pathway for transferring the verified electronic information between the second electrical zone and the third electrical zone in one direction only.

20. The device of claim 12, wherein the at least one pathway comprises at least one hardware component, preferably at least one SerDes pin and/or a unidirectional amplifier.

21. The device of claim 12, wherein the electronic information comprises a file, and wherein the verified electronic information in a transformed state is a wrapped file of file size equating to a size of the file to be transferred plus a size of a new header.

22. A non-transitory computer-readable medium storing instructions that, when executed by a computer, cause the non-transitory computer-readable medium to perform the method of claim 1.

* * * * *